June 12, 1956  J. SCHNEIDER  2,749,648
TROLLING DEVICE
Filed Aug. 4, 1954
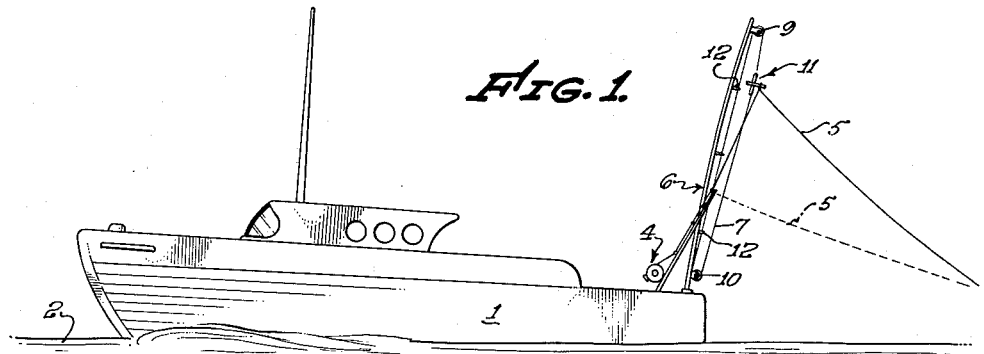
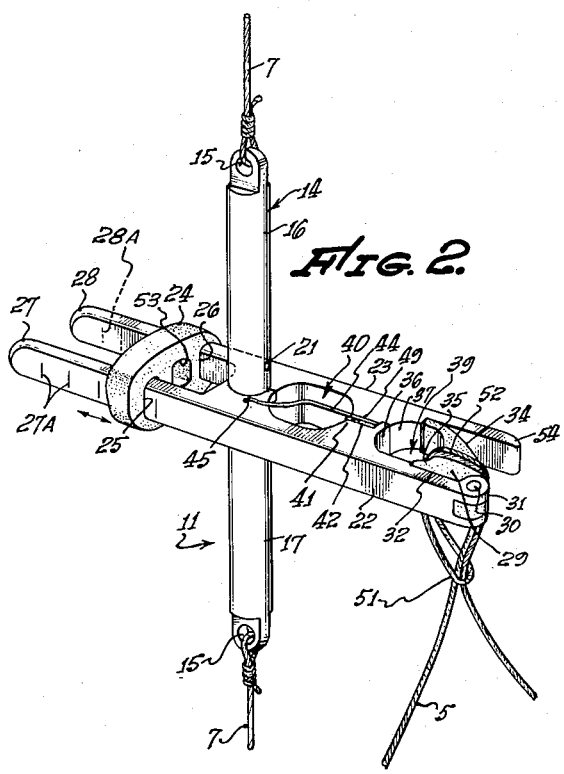
JOHN SCHNEIDER,
INVENTOR.
BY Reed C. Lawler
ATTORNEY.

… … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … … …

United States Patent Office 2,749,648
Patented June 12, 1956

2,749,648

TROLLING DEVICE

John Schneider, Glendale, Calif., assignor to Hehr Manufacturing Company, a corporation of California Application August 4, 1954, Serial No. 447,770

13 Claims. (Cl. 43—42.72)

This invention relates generally to a line holding device for use when trolling for fish, and relates particularly to improved means associated with such device for producing an audible warning of a strike.

When fishing for many of the larger game fish, such as sailfish, marlin, swordfish, amberjack, and the like, it has become normal procedure to troll or otherwise drag a substantial length of line, having one or more hooks and suitable lures thereon, behind a boat, while the boat proceeds slowly through the waters in which the particular fish sought are believed to be available. Normally, fish of this type are caught on heavy tackle, and due to the weight of such tackle and the length of trolling time often experienced between strikes, it becomes tiresome for the angler to hold his rod while awaiting such a strike. Furthermore, the height at which the end of the rod may normally be held by an angler is generally insufficient to permit optimum trolling effectiveness.

To facilitate trolling, use is often made of an outrigger, that is, a small auxiliary mast or boom at the rear or sides of the boat. An endless loop is run through pulleys at the top and at the bottom of this boom or outrigger, and some type of readily detachable line holding means is secured to the endless loop. By this arrangement, the line holding means may be moved to a position at or adjacent to the top or outer end of the outrigger. Heretofore, a very simple means for holding the line aloft on the endless loop has been the use of an ordinary clothes pin. The clothes pin holds between opposite sides a match that secures the fishing line to the hoisting loop. When a fish strikes at bait trailed by the line, the line is pulled loose from its engagement with the clothes pin, and the angular thereafter attempts to land the fish by playing the line inwardly and outwardly until the fish becomes exhausted and may be drawn alongside and then into the boat.

One disadvantage of this prior arrangement is that long periods of time occur during which no fish are encountered. During these periods, the fisherman may occupy himself with other diversions and even occupy himself in other parts of the boat. If he does not happen to notice that his line has been pulled out from the clothes pin, he may miss an opportunity to set the hook in the fish, and the latter frequently will make off with the bait or otherwise remain uncaught.

The trolling device of my invention is arranged to be operated in response to a predetermined amount of tension on the line. This feature provides a more accurate control than would be possible with the other known devices. Most important, it provides such an accurately controllable release in combination with an audible warning signal, which is so designed as to alert the fisherman that a strike has occurred. Thus aroused, he may immediately take command of his tackle and endeavor to land his quarry.

My invention, in brief, takes the form of a line-receiving member having a pair of hinged jaws mounted about a body member that is in turn arranged for suspension adjacent the upper or outer portion of the outrigger. The jaws are positioned as by a resilient member, which is held at an adjustable distance from the pivotal point of the jaws so that any desired amount of resistance to hinged opening movement may be obtained. On the opposite side of the hinge, an anvil and hammer are formed between the opposed jaws. A cap-retaining member is connected to one of the jaws in such a manner as to permit the introduction of an explosive cap between the hammer and anvil. The force with which the jaws are maintained in their initial position by the resilient member, is not sufficient to discharge the cap, but if the hammer and anvil are separated, and suddenly permitted to come together again, the impact will be sufficient to set off the cap. This separation of hammer and anvil is effected by the same action which permits the release of the line from the trigger member, so that the line may drop down to a proper level for control by the fisherman as by his rod and reel. The trigger member, which accomplishes the separation of the jaws for the dual purpose of releasing the line and separating the hammer and anvil preparatory to firing the cap, may consist of a member composed of wear-resistant material, which is hinged to one of the jaws and is normally pressed against the opposite jaw. However, when the tension on the line exceeds a predetermined amount, the trigger member will be rotated about its hinge, spreading the jaws, and permitting release of the line and simultaneously firing the cap.

Various advantages and features of my invention will become apparent from the following description taken in connection with the accompanying drawing, wherein:

Figure 1 is an elevational view of a fishing boat proceeding on the water with fishing tackle and an outrigger carrying the device of this invention for holding the line aloft;

Fig. 2 is an isometric view of the device of the invention, showing details of its attachment to the hoisting loop connected to the outrigger, and of the attachment of the fishing line thereto;

Fig. 3 is a plan view, partially in section, of the device; and

Fig. 4 is a sectional view through the pivot point of the device as taken substantially as indicated by line 4—4, Fig. 3.

Referring now to the drawings, in Fig. 1, a typical fishing boat 1 is shown cruising over the surface of the water 2. At the stern of the boat there is disposed in a suitable rest not shown, a rod and reel 4, from which extends a fishing line 5. The line 5 is normally carried aloft or outwardly during trolling by means of the outrigger 6, which may be in the form of a light flexible mast or pole fitted with a hoisting line 7, reeved through pulley blocks 9 and 10 at the top and bottom respectively of the outrigger. The line 7 has its ends joined to form an endless loop by means of the device of my invention, indicated generally as 11. The fisherman attaches the line 5 to the device 11, with the latter at the lower end of the outrigger near pulley block 10. He then raises the device 11 to a position near pulley block 9 at the top of the outrigger, and suitably fixes the endless loop in position. Several eyes 12 may be fixed to the outrigger 6, with the endless hoisting loop member 7 passing therethrough, in order to prevent the hoisting lines from becoming entangled on opposite sides of the endless loop.

The purpose in raising the outrigger substantially above the height to which the end of the fisherman's rod would reach, is to permit the bait to skip and jump along the surface of the water as the trolling proceeds. The bait is frequently a dead flying fish, and by elevating the point at which the line is suspended, it is possible for the bait to be pulled along behind the boat with a separation of from 50 to 150 yards between the boat and the point where the line engages the water. These distances are found desirable to make the bait jump and skip on the water surface, thus simulating a live flying fish. This elevated position of the forward end of the line 5 also reduces the noise and agitation of the water caused by the passage of the line through the water, which might otherwise alarm the fish and discourage him from taking the bait.

Another problem for which my invention offers a solution, is that of providing for different values of tension on the fishing line. For example, if the bait and hook encounter the resistance offered by floating kelp, a much greater tension on the line may result than that due solely to the resistance of the water at normal trolling speeds, usually about 3 knots. When the fish takes the bait, it is desirable that he be permitted to swallow it initially without substantial resistance from the line. These and other factors known to fishermen combine to make it desirable to have a more readily controllable release point than that which can be afforded by the conventional clothes pin, match stick, or the like, when used as a means of holding the line aloft. This function of providing a predeterminable tension release point is well performed by the device of my invention, which is shown in greater detail in Figs, 2, 3, and 4.

The device 11 comprises basically two parts, a body member 14 and a pair of hinged jaws. The body member 14 is shown as being of substantially cylindrical construction, with an eye 15 at each end for the attachment thereto of the hoisting line 7, thereby completing the endless hoisting loop. The body member 14 is preferably made in two parts, an upper body portion 16 and a lower body portion 17. An axial recess 19 is formed in one of said parts, here shown as the upper body portion 16, and is adapted to receive a pivot tongue 20 extending from the other part here shown as the lower body portion 17. The pivot tongue 20 is secured in the recess 19 as by a force-fitted pin 21 or the like, with the ends being ground off and polished smooth to form a continuation of the surface of the body member.

The pivot tongue 20 is of lesser diameter than that of the adjacent upper and lower body portions 16 and 17, so that the adjacent ends of the latter two members form shoulders to retain the jaw members 22 and 23 together between the ends of the portions 16 and 17 of the body member 14. Cooperating portions of jaw members 22 and 23 are bored to receive the pivot tongue 20, which is passed therethrough before being secured by means of the pin 21 to the upper body portion 16. The jaw members 22 and 23 are free to pivot about the tongue 20.

As shown primarily in Figs. 2 and 3, the jaw members 22 and 23 are adjustably biased in one pivotal direction about the tongue 20 as by a resilient member 24 disposed therebetween. The member 24 may be a flat rubber washer of generally oval outline, having formed therethrough two rectangular bores 25 and 26, which are slidably received on elongated rectangular leg portions 27 and 28 of the jaw members 22 and 23 respectively. The resilient member 24 may be slid to any desired position along the legs 27 and 28. It will be appreciated that the spacing between the resilient member 24 and the pivot tongue 20 will determine the effective resistive force exerted by the member 24 for holding the line 5. Scales 27A and 28A may be marked along the legs 27 and 28 to indicate the proper positions of the resilient member 25 for different resistive forces which must be overcome before the trigger will be tripped and the line 5 released.

The body member 14 and the jaw members 22 and 23 are preferably formed from a corrosion-resistant metal, such as, for example, stainless steel. The trigger member may be formed as by molding from a material such as, for example, "Nylon," which will not rust and which will not mark or fray the line when exposed to the corrosive effects of a combination of sunlight, salt water, and salt-water-laden air. The trigger member, in addition, must be very wear-resistant, and should be somewhat resilient.

Trigger member 29 may be secured by a hinge pin 30 to the jaw member 22 in such a way as to permit it to swing, when not restricted, through a substantial arc. The solid lines in Fig. 3 illustrate the normal locked position of the trigger 29 while the unlocked position is shown by the dotted lines.

The trigger member 29 may be in the form of a lever having a pivotal bearing portion 31, a straight side 32 and an arcuate side 34 extending therefrom. When in closed position, the trigger engages an inner surface of both jaw members 22 and 23. The side 34 approaches substantial tangency with the opposite jaw member leg 23. The ends of the sides 32 and 34 are connected as by a concave semi-circular side 35, which constitutes a line-engaging surface. The concave curvature of the semi-circular side 35 is concentric with semi-circular engaging surfaces 36 and 37 formed on the jaw members 22 and 23, respectively. Curved portions 35, 36 and 37 thus form a smooth continuous circular line-receiving opening 39, with all corners and edges rounded to minimize wear on the line. The surfaces 36 and 37 also serve to define sides of a hammer and anvil portion, limited on the opposite side by an elliptical opening indicated generally at 40.

An anvil 41 is formed on the jaw member 22 and is arranged to have an explosive cap 42 held thereagainst as by means of a resilient retaining member 44. An end 45 of the retaining member 44 may be anchored in the jaw member 22, as by being press-fitted into a receiving groove 46 formed therein. The cap may be accurately positioned by seating it on the anvil 41 against a locating shoulder 47 provided for that purpose. The hammer 49, formed on the jaw member 23 and adapted for registry with the anvil 41, is notched as at 50 to receive the locating shoulder 47.

When the device is assembled, the square bores 25 and 26 in the resilient member 24 are so spaced that in all positions they exert a slight outward pressure against the legs 27 and 28. The trigger 29 is so dimensioned that normally it will not be deformed by pressure of the legs 22 and 23 thereagainst. The slight pressure exerted by the resilient member 24 presses the hammer and anvil portions 49 and 41 together, this pressure being insufficient to cause the cap 42 to explode. However, the jaw-closing force exerted by the member 24 is sufficient to prevent the line from being pulled therefrom during normal trolling activities, unless a strike occurs.

Ordinarily, a larkshead knot 51 is tied in the line 5, fitting the bight 52 over the concave circular side 35 of the trigger. In some instances, however, it may be desirable merely to wrap the line two or more times about the trigger member 29 without making a knot therein. The portion of the line extending between the knot 51 and the reel 4 is generally left quite loose and the reel is maintained on a "free spool" setting. When the tension on the line 5 exceeds a predetermined value, the trigger 29 is pulled outwardly and pivoted about the hinge pin 30. The resilience of the trigger 29 permits the portion thereof defined between the arcuate side 34 and the side 35 to deform somewhat in its cam action in spreading the legs 22 and 23 against the resistance of the resilient member 24. A relief bore 53 formed through member 24 prevents this resistance from being excessive. When the spaced ends of the arcuate side 34 and straight side 32 have been pulled past the free end of the leg 23, the bight 52 of the larkshead knot 51, or the multiple wrapping about the trigger member, falls free of the trigger 29. The line then drops into the normal fishing position, as shown by the dotted line 55 in Fig. 1, and the resilience of member 24 immediately causes the hammer 49 and anvil 41 to snap together, firing cap 42. The release of the line and the production of the audible warning signal occur substantially simultaneously.

The predetermined tension at which the trigger 29 opens is determined by the torque exerted by the resilient member 24 on the jaw members 22 and 23 about their pivot axis. This torque is varied by adjusting the position of the resilient member 24 on the arms 27 and 28.

After taking the bait and tripping the trigger 29, the fish is generally permitted to "run" with the line from the "free spool" of the reel. After having been notified by the exploding cap that his bait has been taken by a fish, the fisherman then has sufficient time to enable him to take up his tackle, change the position of the reel from "free spool" to a "reeling" position, set the hook in the fish, and exercise the necessary fishing skill to land his fish.

Though only one embodiment of the invention has been described herein, it will be obvious to those skilled in the art that many changes may be made in the materials, form and construction of the various parts thereof without departing from the invention as defined by the following claims.

I claim:

1. In a line holding device: pivoted jaw means; trigger means disposed between said jaw means, said trigger means being movable relative to said jaw means between an open position and a closed position and being adapted in said closed position for holding a portion of a line in a trolling position; and means for biasing said jaw means toward a closed position, said jaw means being movable toward an open position by action of said trigger means and in response to a predetermined tension on said line, thereby to release said portion of said line.

2. In a line holding device: pivoted jaw means; trigger means disposed between said jaw means, said trigger means being movable relative to said jaw means between an open position and a closed position and being adapted in said closed position for holding a portion of a line in a trolling position; means for biasing said jaw means toward a closed position, said jaw means being movable toward an open position by action of said trigger means and in response to a predetermined tension on said line, thereby to release said portion of said line; and means responsive to closing of said jaw means by said biasing means for producing an audible warning signal.

3. In a line holding device: pivoted jaw means; trigger means pivotally mounted on one of said jaw means for pivotal movement relative to both jaw means from a closed position between them to an open position, said trigger means being adapted for holding a portion of a line in a trolling position; and means for biasing said jaw means toward a closed position, said jaw means being movable toward an open position by pivotal action of said trigger means and in response to a predetermined tension on said line, thereby to release said portion of said line.

4. In a line holding device: pivoted jaw means; trigger means pivotally mounted on one of said jaw means for pivotal movement relative to both jaw means from a closed position between them to an open position, said trigger means being adapted for holding a portion of a line in a trolling position; means for biasing said jaw means toward a closed position, said jaw means being movable toward an open position by pivotal action of said trigger means and in response to a predetermined tension on said line, thereby to release said portion of said line; and means responsive to closing of said jaw means by said biasing means for producing an audible warning signal.

5. A line holding device comprising, in combination: a pair of jaws; means for supporting said jaws relative to a boat; a pivoted line engaging trigger pivotally mounted on one of said jaws for pivotal movement relative to both jaws from a closed position between them to an open position; and adjustable means for selectively biasing said jaws toward a closed position, said jaws being adapted for movement toward an open position by pivotal action of said trigger to release said line in response to a predetermined tension on said line.

6. A line holding device comprising, in combination: a pair of pivoted jaws; means for supporting said jaws in an elevated position relative to a boat; a pivoted line engaging lever-cam trigger disposed between said jaws; one end of said lever-cam trigger being pivotally mounted on one of said jaws and the other end being engageable with but movable relative to the other jaw; and adjustable means for selectively biasing said jaws toward a closed position, said jaws being adapted for movement toward an open position by pivotal cam action of said lever-cam trigger to release said line in response to a predetermined tension on said line.

7. A line holding device comprising, in combination: a pair of pivoted jaws; means for supporting said jaws in an elevated position relative to a boat; a pivoted line engaging lever-cam trigger disposed between said jaws, one end of said lever-cam trigger being pivotally mounted on one of said jaws and the other end being engageable with but movable relative to the other jaw; adjustable means for selectively biasing said jaws toward a closed position, said jaws being adapted for movement toward an open position by pivotal cam action of said lever-cam trigger to release said line in response to a predetermined tension on said line; and means responsive to a snap-action closing of said jaws for producing an audible warning signal.

8. A fishing line holding device comprising, in combination: a pair of jaw members; pivot means for said jaw members; means associated with said pivot means for supporting said device in an elevated position on a boat; a line-engaging pivoted lever-cam trigger disposed between said jaw members on one side of said pivot means; one end of said lever-cam trigger being pivotally mounted on one of said jaw members and the other end being engageable with but movable relative to the other jaw member; and resilient means disposed on another side of said pivot means for biasing said jaw members toward a closed position and normally into contact with said trigger member, said trigger member being adapted to move said jaw members toward an open position upon pivotal movement thereof to release said line in response to a predetermined tension on said fishing line.

9. A fishing line holding device comprising, in combination: a pair of jaw members; pivot means for said jaw members; means associated with said pivot means for supporting said device in an elevated position on a boat; a line-engaging pivoted lever-cam trigger disposed between said jaw members on one side of said pivot means; one end of said lever-cam trigger being pivotally mounted on one of said jaw members and the other end being engageable with but movable relative to the other jaw member resilient means adjustably disposed on another side of said pivot means for selectively biasing said jaw members toward a closed position and normally into contact with said trigger member, said trigger member being adapted to move said jaw members toward an open position upon pivotal movement thereof to release said line in response to a predetermined tension on said fishing line; and means responsive to a closing movement of said jaw members for producing an audible warning signal.

10. A fishing line holding device comprising, in combination: a pair of jaw members; pivot means for said jaw members; means associated with said pivot means for supporting said device in an elevated position on a boat; a line-engaging pivoted lever-cam trigger disposed between said jaw members on one side of said pivot means; resilient means adjustably disposed on another side of said pivot means for selectively biasing said jaw members toward a closed position and normally into contact with said trigger member, said trigger member being adapted to move said jaw members toward an open position upon pivotal movement thereof to release said line in response to a predetermined tension on said fishing line; and means disposed between said trigger member and said pivot means and responsive to a closing movement of said jaw members for producing an audible warning signal.

11. A fishing line holding device comprising, in combination: a pair of jaw members; pivot means for said jaw members; means associated with said pivot means for supporting said device in an elevated position on a boat; a line-engaging pivoted lever-cam trigger disposed between said jaw members on one side of said pivot means; resilient means disposed on another side of said pivot means for biasing said jaw members toward a closed position and normally into contact with said trigger member, said trigger member being adapted to move said jaw members toward an open position upon pivotal movement thereof to release said line in response to a predetermined tension on said fishing line; an anvil formed in association with one of said jaw members; a hammer formed in association with another of said jaw members; and means for retaining an exposive cap on said anvil whereby, upon a closing movement of said jaw members, to explode said cap, thereby producing an audible warning signal.

12. A device for holding a fishing line in an elevated trolling position on a boat comprising, in combination: a pair of jaw members; a pivotal connection for said jaw members; means interconnecting said pivotal connection with a support for said device; a trigger member pivotally connected to one of said jaw members and disposed on one side of said pivotal connection, said trigger member being adapted freely to receive a portion of said line and to engage the other of said jaw members when in a closed position; resilient means disposed on another side of said pivotal connection for urging said jaw members toward said closed position; means for selectively adjusting the torque applied by said resilient means for holding said jaw members in closed position; an anvil carried by said one of said jaw members; means for holding an explosive cap in position on said anvil; and a hammer carried by said other of said jaw members and cooperably aligned with said anvil, said anvil and hammer being disposed intermediate said trigger and said pivotal connection, said trigger being adapted for pivotal movement in response to a predetermined tension on said line to move said jaw members toward an open position by cam action therebetween and to release said portion of said line, said resilient means thereafter moving said jaw members toward a closed position by snap-action bringing said hammer into operative contact with said cap for exploding same and producing an audible warning signal.

13. A device for holding a fishing line in an elevated trolling position on a boat comprising, in combination: a pair of elongated jaw members; a pivotal connection for said jaw members; body means interconnecting said pivotal connection with a support for said device; a trigger member pivotally connected to one end of one of said jaw members and disposed on one side of said pivotal connection, said trigger member being adapted freely to receive a portion of said line and to engage the other of said jaw members when in a closed position; resilient means disposed on another side of said pivotal connection for urging said jaw members toward said closed position; means for selectively adjusting the torque applied by said resilient means for holding said jaw members in closed position; an anvil carried by said one of said jaw members; means carried by said one of said jaw members for holding an explosive cap in position on said anvil; and a hammer carried by said other of said jaw members and cooperably aligned with said anvil, said anvil and hammer being disposed intermediate said trigger and said pivotal connection, said trigger being adapted for pivotal movement in response to a predetermined tension on said line to move said jaw members toward an open position by cam action therebetween and to release said portion of said line, said resilient means thereafter moving said jaw members toward a closed position by snap-action bringing said hammer into operative contact with said cap for exploding same and producing an audible warning signal.

References Cited in the file of this patent

UNITED STATES PATENTS

| 112,203 | Wattles | Feb. 28, 1871 |
| 1,800,756 | Sass | Apr. 14, 1931 |
| 1,808,736 | Hernke | June 2, 1931 |
| 2,340,212 | Cohen | Jan. 25, 1944 |

FOREIGN PATENTS

| 457,835 | Great Britain | Dec. 7, 1936 |